US012123339B1

(12) United States Patent
Taylor

(10) Patent No.: US 12,123,339 B1
(45) Date of Patent: Oct. 22, 2024

(54) TURBINE WASTEGATE LINKAGE ASSEMBLY

(71) Applicant: Garrett Transportation I Inc., Torrance, CA (US)

(72) Inventor: Keith Taylor, Torrance, CA (US)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 18/398,886

(22) Filed: Dec. 28, 2023

(51) Int. Cl.
*F02B 37/18* (2006.01)
*F01D 17/10* (2006.01)

(52) U.S. Cl.
CPC .......... *F02B 37/186* (2013.01); *F01D 17/105* (2013.01); *F05D 2220/40* (2013.01); *F05D 2260/52* (2013.01); *F05D 2260/57* (2013.01)

(58) Field of Classification Search
CPC ........................ F02B 37/18–186; F01D 17/105
See application file for complete search history.

(56) References Cited

U.S. PATENT DOCUMENTS 5,146,753 A 9/1992 Potter
6,079,210 A * 6/2000 Pintauro ............... F02B 37/186 123/568.21
9,890,699 B2 2/2018 Micanek et al.
10,167,773 B2 1/2019 Vlachy et al.
10,487,725 B2 11/2019 Takahashi et al.
10,550,760 B2 * 2/2020 Marques ............... F01D 17/141
2003/0196435 A1 10/2003 Heath
2015/0247448 A1 * 9/2015 Micanek ............... F02B 37/186 415/119
2016/0053675 A1 2/2016 Mehne et al.

FOREIGN PATENT DOCUMENTS

DE 10 2011 007 417 A1 10/2012
DE 10 2013 207 677 A1 10/2014
EP 2 821 615 A1 7/2015
WO 2005008041 A1 1/2005

* cited by examiner

*Primary Examiner* — Laert Dounis
(74) *Attorney, Agent, or Firm* — BelayIP

(57) ABSTRACT

An assembly can include a turbine assembly that includes a wastegate; an actuator assembly that responds to a control signal to transition the wastegate from a closed position to an open position; a linkage assembly that includes a control coupling, a wastegate coupling, and a spring guide, where the wastegate coupling is operatively coupled to the wastegate and the control coupling is operatively coupled to the actuator assembly; and a spring assembly that includes a spring that includes an extension, where the extension forcibly contacts the spring guide at a closed angle of contact for the closed position of the wastegate and at an open angle of contact for the open position of the wastegate, where the open angle of contact is less than the closed angle of contact.

14 Claims, 12 Drawing Sheets

TURBINE WASTEGATE LINKAGE ASSEMBLY

TECHNICAL FIELD

Subject matter disclosed herein relates generally to turbines and wastegates.

BACKGROUND

A turbocharger can increase output of an internal combustion engine. A turbocharger can include an exhaust turbine assembly that can receive exhaust gas from cylinders of an internal combustion engine. Exhaust may be directed to a turbine wheel such that energy may be extracted, for example, to drive a compressor wheel of a compressor assembly.

A turbine wastegate, or simply a "wastegate", is typically a valve that can be controlled to selectively allow at least some exhaust to bypass a turbine. Where an exhaust turbine drives a compressor for boosting inlet pressure to an internal combustion engine (e.g., as in a turbocharger), a wastegate provides a means to control the boost pressure.

A so-called internal wastegate is integrated at least partially into a turbine housing. An internal wastegate typically includes a flapper valve (e.g., a plug), a crank arm, a shaft or rod, and an actuator. A plug of a wastegate often includes a flat disk-shaped surface that seats against a flat seat (e.g., a valve seat or wastegate seat) disposed about an exhaust bypass opening, though various plugs may include a protruding portion that extends into an exhaust bypass opening (e.g., past a plane of a wastegate seat).

In a closed position, a wastegate plug should be seated against a wastegate seat (e.g., seating surface) with sufficient force to effectively seal an exhaust bypass opening (e.g., to prevent leaking of exhaust from a high-pressure exhaust supply to a lower pressure region). Often, an internal wastegate is configured to transmit force from an arm to a plug (e.g., as two separate, yet connected components). During engine operation, load requirements for a wastegate vary with pressure differential. High load requirements can generate high mechanical stresses in a wastegate's kinematics components, a fact which has led in some instances to significantly oversized component design to meet reliability levels (e.g., as demanded by engine manufacturers). Reliability of wastegate components for gasoline engine applications is particularly important where operational temperatures and exhaust pulsation levels can be quite high.

Various examples of wastegates, wastegate assemblies, wastegate components and wastegate related processes are described herein.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1A:
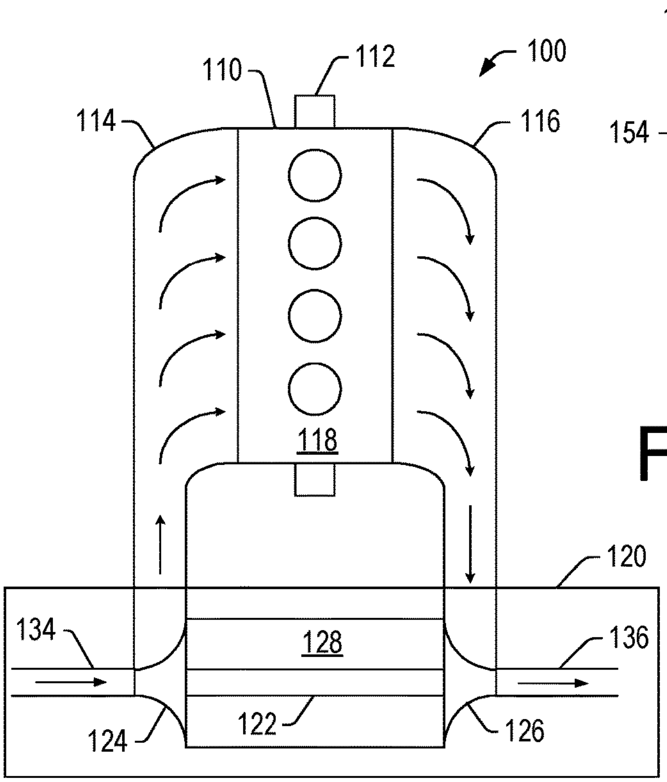
FIGS. 1A, 1B, 1C, 1D, and 1E are diagrams of an example of a system, examples of manifolds and turbochargers, an example of a vehicle, and an example of a turbocharger operatively coupled to a controller.

Turbochargers are frequently utilized to increase output of an internal combustion engine. Referring to FIG. 1A, as an example, a system 100 can include an internal combustion engine 110 and a turbocharger 120. As shown in FIG. 1D, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1D, a treatment unit 107 may be provided to treat exhaust (e.g., to reduce emissions via catalytic conversion of molecules, etc.).

As shown in FIG. 1A, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1A and FIG. 1E, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1E, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1E, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1E, an exhaust gas recirculation (EGR) conduit 115 is also shown, which may be provided, optionally with one or more valves 117, for example, to allow exhaust to flow to a position upstream the compressor wheel 125.

Figure 1B:
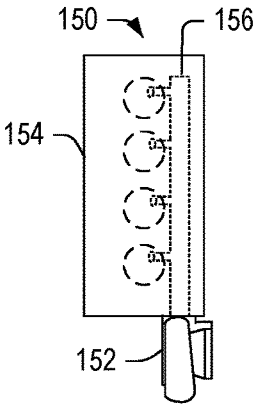
Figure 1C:
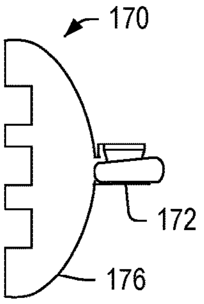
Figure 1D:
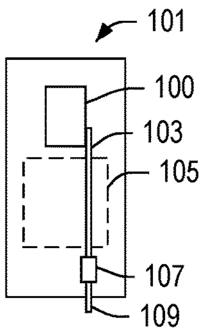
Figure 1E:
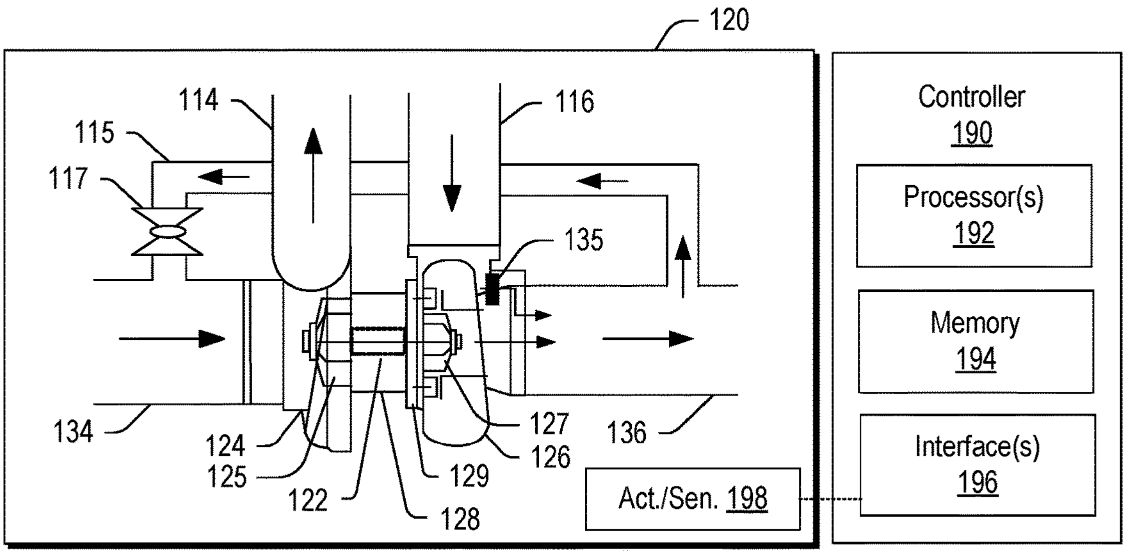

In FIG. 1B, an example arrangement 150 for flow of exhaust to an exhaust turbine housing assembly 152 is shown and, in FIG. 1C, another example arrangement 170 for flow of exhaust to an exhaust turbine housing assembly 172 is shown. In the arrangement 150 of FIG. 1B, a cylinder head 154 includes passages 156 within to direct exhaust from cylinders to the turbine housing assembly 152 while in the arrangement 170 of FIG. 1C, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1E, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), exhaust gas recirculation (EGR), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc.

As an example, an actuator for a wastegate may be a mechanical actuator, for example, that may operate without a need for electrical power (e.g., consider a mechanical actuator configured to respond to a pressure signal supplied via a conduit). As an example, an actuator for a wastegate may be an electromechanical actuator that can include an electric motor that can rotate a shaft to cause opening or closing of a wastegate. In such an example, the electric motor may be operable to rotate a shaft in a clockwise direction and to rotate the shaft in a counter-clockwise direction.

As an example, a wastegate may be a "push-to-open" wastegate (PTO wastegate) or a "push-to-close" wastegate (PTC wastegate). As explained, a wastegate and associated components may experience, directly and/or indirectly, various mechanical forces and exhaust forces which may, individually or together, increase a risk of exhaust leakage when the wastegate is in a closed position. Where an actuator is configured to consume energy to maintain a wastegate in a closed position, the amount of energy consumed may be substantial and depend on forces that the wastegate experiences in the closed position (e.g., consider exhaust pressure, which may vary dynamically). While a lock mechanism may be utilized (e.g., a dead point lock) in an effort to maintain a wastegate in a closed position without having to supply energy to an actuator, various factor can impact such a mechanism, which may, for example, lead to sub-optimal performance over time.

Figure 2:
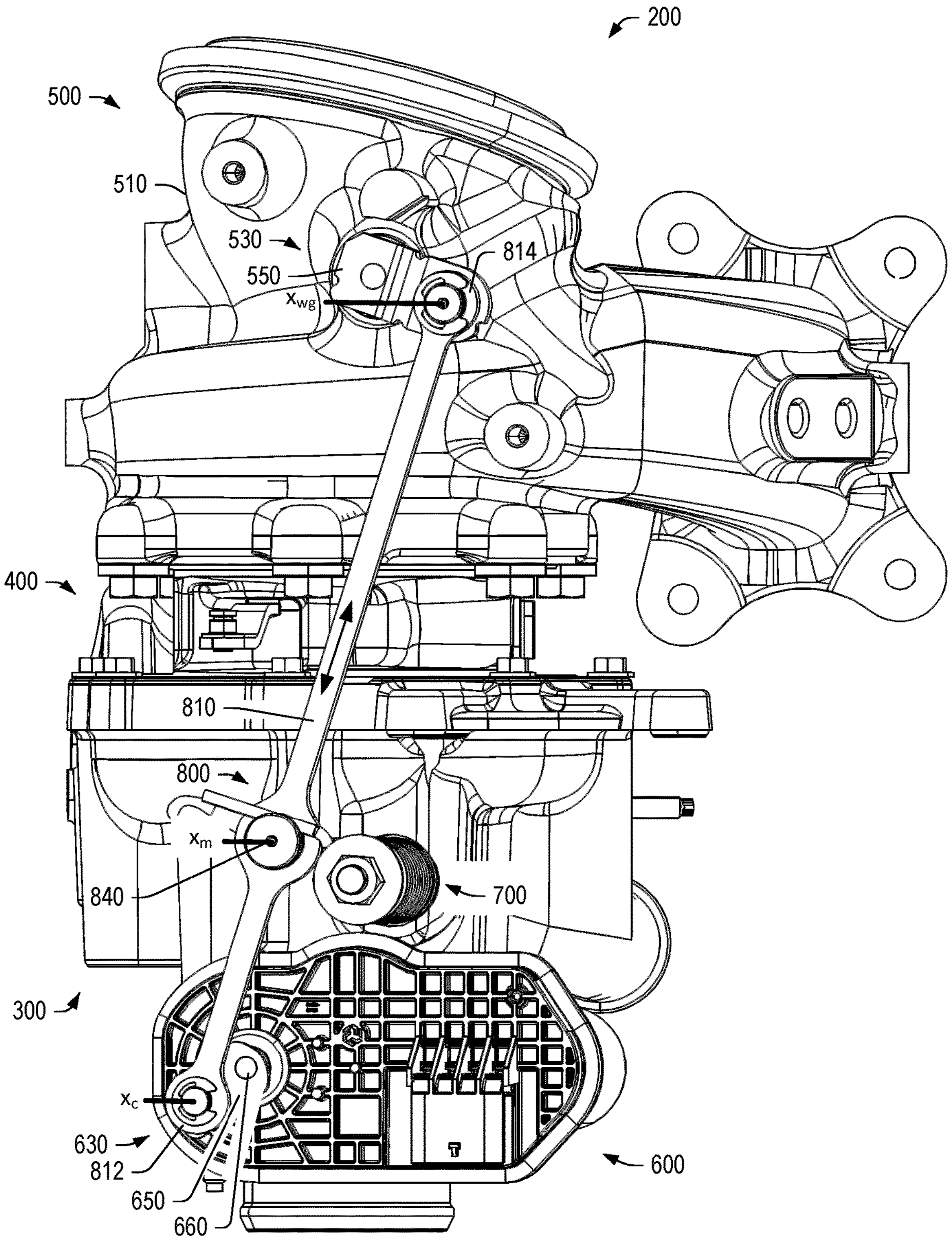
FIG. 2 shows a side view of an example of an assembly.

FIG. 2 shows an example of an assembly 200 that includes a compressor assembly 300, a center housing assembly 400, a turbine assembly 500, an actuator assembly 600, a spring assembly 700 and a linkage assembly 800. In the example of FIG. 2, the actuator assembly 600 is a rotary actuator assembly, noting that a linear actuator assembly may be utilized.

As shown, the turbine assembly 500 includes a turbine housing 510 and a wastegate assembly 530 that includes a wastegate (see, e.g., FIG. 3) operatively coupled to a wastegate arm 550 where the wastegate can be controllably operated to be in a closed position or in one or more open positions. For example, the actuator assembly 600 can be actuated via a control signal to cause movement of an actuator arm 650 to thereby cause movement of the linkage assembly 800, which, in turn, can rotate the wastegate arm 550 to transition the wastegate from an open position to a closed position or another open position or from a closed position to an open position. As explained, in an open position, exhaust may flow through a wastegate opening such that a portion of exhaust directed to the turbine housing 510 bypasses a turbine wheel space defined at least in part by the turbine housing 510.

In the example of FIG. 2, the actuator assembly 600 includes a motor assembly 630 that includes a rotatable shaft 660 that is coupled to the actuator arm 650. In the example of FIG. 2, the actuator arm 650 is in a position that corresponds to a closed position of the wastegate. As shown, in the closed position, a corresponding position a linkage 810 of the linkage assembly 800 can be defined by positions of a control coupling 812, $x_c$, a spring guide 840, $x_m$, and a wastegate coupling 814, $x_{wg}$, relative to the assembly 200. For example, the linkage 810 may be a substantially straight linkage that may be defined by an x-axis (e.g., from the control coupling 812 to the wastegate coupling 814) where the linkage 810 may translate, generally, in opposing directions of the x-axis; noting that the linkage 810 may also shift slightly in space (e.g., to the left or to the right) when driven by a rotary actuator; whereas, a linear actuator may cause the linkage 810 without or with lesser off-axis shifting. For example, clockwise rotation of the rotatable shaft 660 can cause the actuator arm 650 to drive the control coupling 812 of the linkage 810 generally upwardly in a direction toward the turbine assembly 500 where the wastegate coupling 814 drives rotation of the wastegate arm 550 to thereby cause the wastegate to transition from a closed position to an open position. Such a configuration may be referred to as a PTO configuration as the actuator arm 650 acts to effectively push the linkage 810 to open the wastegate.

As shown in the example of FIG. 2, the assembly 200 also includes the spring assembly 700 whereby the spring assembly 700 applies force to the spring guide 840 to forcibly bias the linkage 810 in a direction away from the turbine assembly 500. Hence, to transition the wastegate from a closed position to an open position or from an open position to a further open position, the actuator assembly 600 must overcome the force applied by the spring assembly 700 to the spring guide 840 of the linkage assembly 800. However, the spring assembly 700 can assist the actuator assembly 600 when the actuator assembly 600 acts to maintain the wastegate in a closed position. In various examples, the spring assembly 700 may completely assist the actuator assembly 600 such that the motor assembly 630 may be powered down (e.g., to zero power or a low-level standby power). In such an approach, the energy may be conserved and/or operational life of the actuator assembly 600 extended. As an example, the actuator assembly 600 may be configured to deliver force in an asymmetric manner. For example, it may be rated to deliver more force in a clockwise direction for opening a wastegate and lesser force in a counter-clockwise direction for closing a wastegate as the spring assembly 700 can provide for that can supplant or supplement closing of the wastegate.

Figure 3:
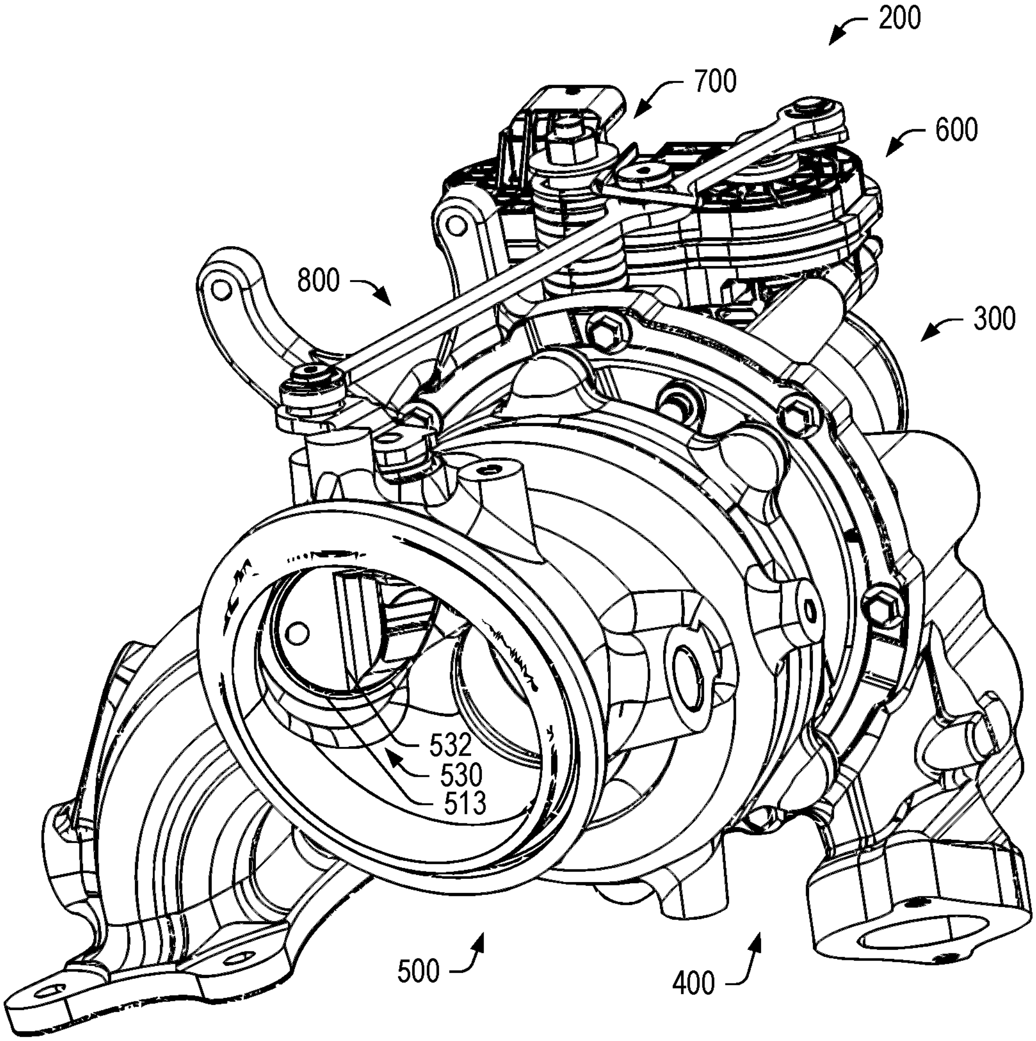
FIG. 3 shows a perspective view of an example of the assembly of FIG. 2 with a wastegate in a closed position.

FIG. 3 shows an example of the assembly 200 where the wastegate 532 is in a closed position with respect to a wastegate opening 513 of the turbine assembly 500.

Figure 4:
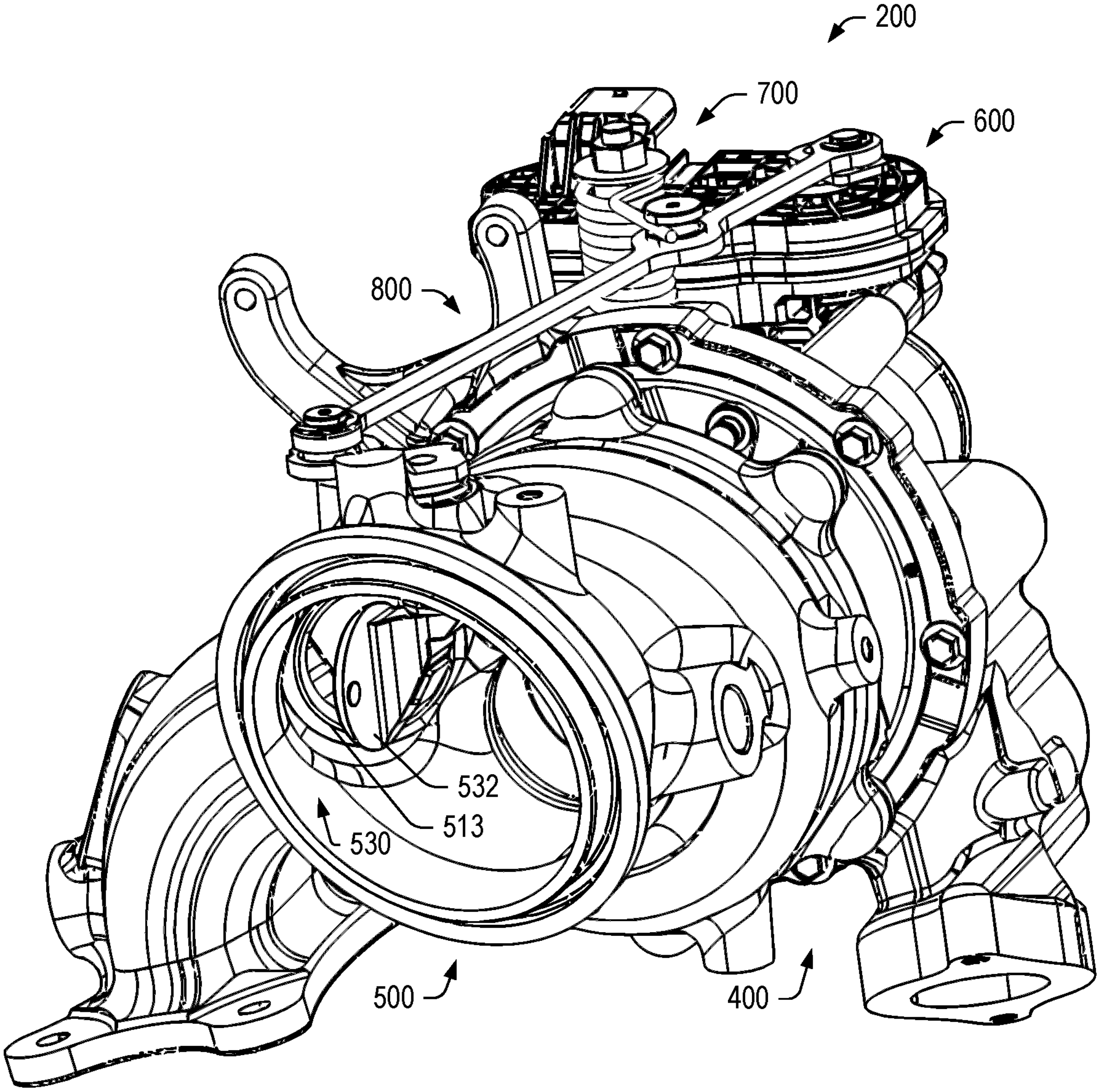
FIG. 4 shows a perspective view of an example of the assembly of FIG. 2 with a wastegate in an open position.

FIG. 4 shows an example of the assembly 200 where the wastegate 532 is in an open position with respect to the wastegate opening 513 of the turbine assembly 500.

Figure 5:
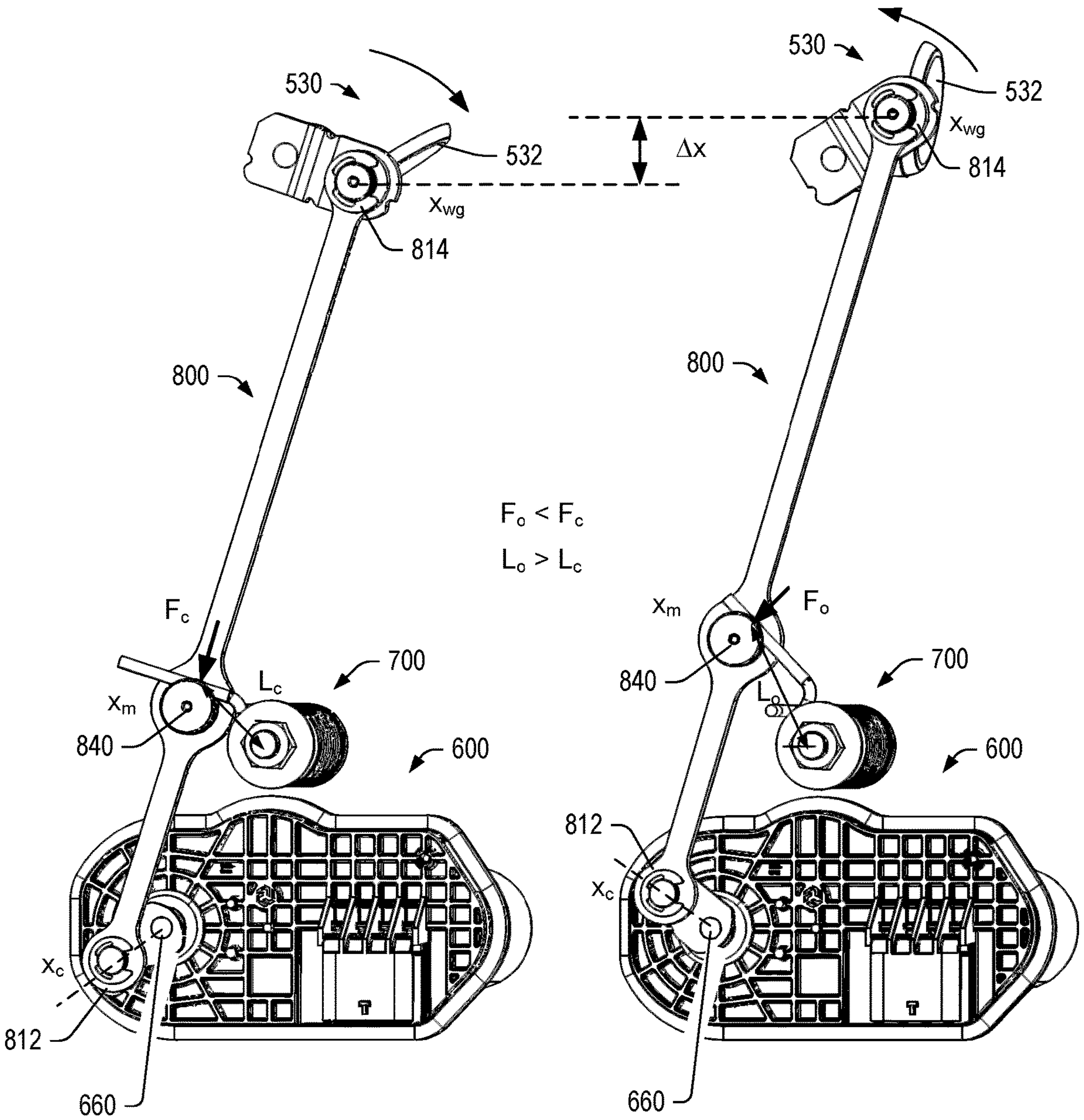
FIG. 5 shows an example of a method that includes transitioning a wastegate.

FIG. 5 shows an example of a portion of the assembly 200 that includes the wastegate assembly 530, the actuator assembly 600, the spring assembly 700 and the linkage assembly 800 as transitioning between a closed position (left) and an open position (right). As shown, relationships can be defined between the spring assembly 700 and the spring guide 840, which may include relationships as to force and space. For example, consider a force $F_c$ as applied by the spring assembly 700 for the closed position along with a distance $L_c$ between a spring axis and a contact region on the spring guide 840, and consider a force $F_o$ as applied by the spring assembly 700 for the open position along with a distance $L_o$ between the spring axis and a contact region on the spring guide 840. As shown, $F_o<F_c$ and $L_o>L_c$. In the example of FIG. 5, a distance $\Delta x$ is also shown as a translation distance of the linkage assembly 800. For example, force applied by the spring assembly 700 can be related to a translation distance, which relates to transition of the wastegate 532.

As shown in the example of FIG. 5, which is an example of a PTO configuration, counter-clockwise rotation of the shaft 660 results in clockwise rotation of the wastegate 532 and clockwise rotation of the shaft 660 results in counter-clockwise rotation of the wastegate 532. Such relationships may depend on configuration of components; noting, as mentioned, a spring assembly biasing approach may be utilized for a PTC configuration (e.g., where a spring assembly helps to maintain a wastegate in a closed position).

Figure 6:
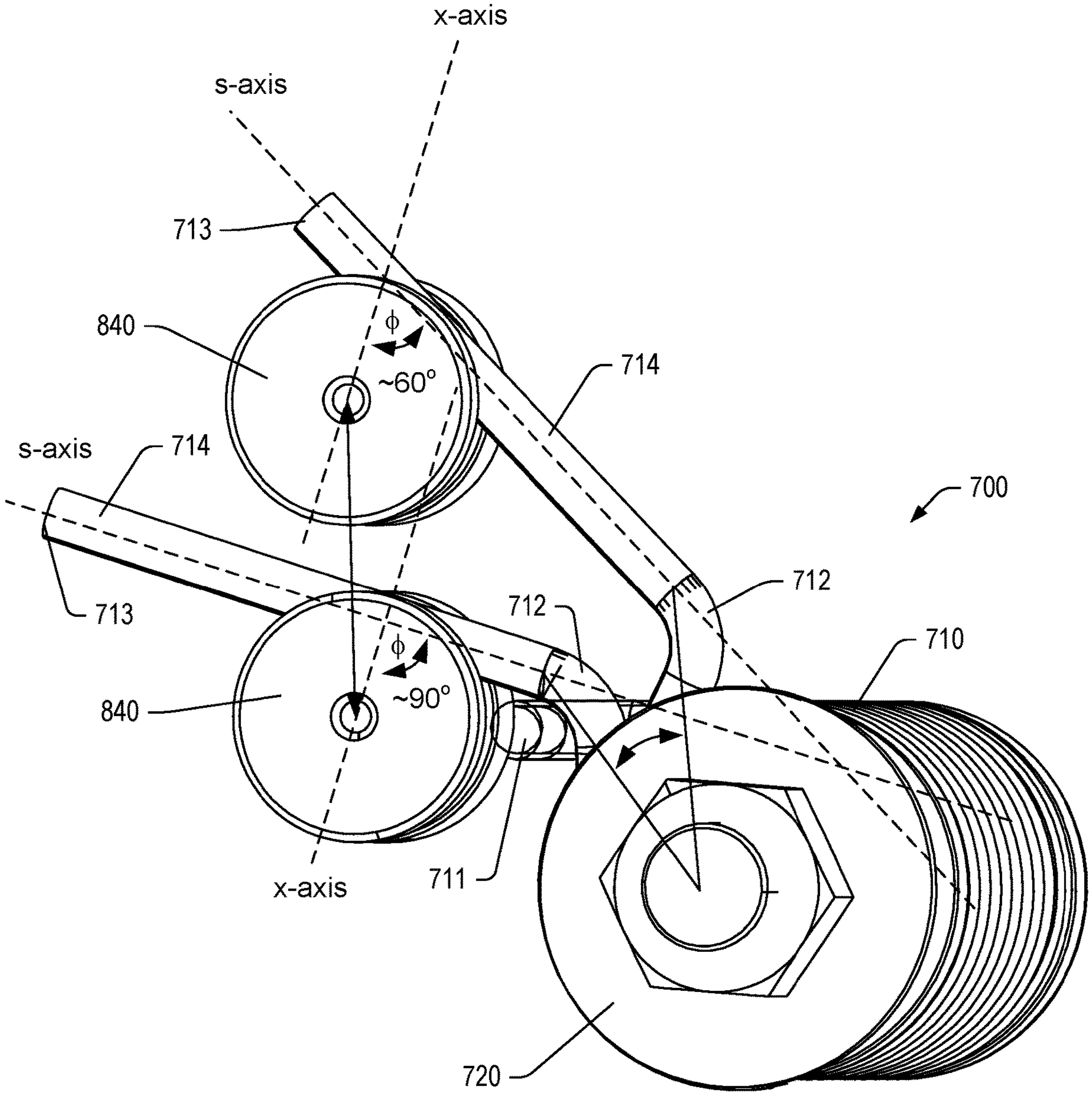
FIG. 6 shows a perspective view of an example of a spring guide and an example of a spring assembly.

FIG. 6 shows an example of the spring guide 840 in relationship to the spring assembly 700 for closed and open positions of a wastegate. As shown, the spring assembly 700 can include a spring 710 as carried by a spring holder 720 where the spring 710 includes opposing ends 711 and 713 where, between the opposing ends 711 and 713, the spring 710 includes a number of turns, a bend 712 and an extension 714. As an example, the end 711 may be utilized as a stop, for example, to limit the position of the bend 712 and hence the extension 714, which may be a closed position stop (e.g., for a closed position of a wastegate).

As shown in FIG. 6, as the spring guide 840 is driven by operation of an actuator, the relationship between the spring guide 840 and the extension 714 of the spring 710 changes, which may be defined in part via the distances $L_c$ and $L_o$ and/or one or more other distances, angles, etc. In particular, an angle $\phi$ between the x-axis of the linkage 810 and an axis, referred to as the s-axis, of the extension 714 of the spring 710 changes. For example, for the closed position of a wastegate, the closed angle for $\phi$ may be approximately 90 degrees (e.g., plus or minus 10 degrees, etc.) and, for the open position, an open angle for $\phi$ can be less than the closed angle. For example, consider the open angle being more than 10 degrees less than the closed angle. In the example of FIG. 6, the open angle is approximately 60 degrees; whereas, the closed angle is approximately 90 degrees. In such an approach, for a relatively small angle of deflection of the extension 714 (e.g., less than 90 degrees), a force balance demonstrates that the force experienced by the spring guide 840 is less when the angle is smaller (e.g., $F_o$ is less than $F_c$).

As an example, the amount of force applied by a spring assembly to a spring guide of a linkage for wastegate control can diminish as a wastegate become more open. In such an approach, the amount of force applied by an actuator may diminish when the actuator is called upon to transition a wastegate to a more open position. Thus, the amount of energy consumed by an actuator may be greater in transitioning a wastegate from a closed position to a first open position than for transitioning the wastegate from the first open position to a second, more open position. Over the lifetime of an actuator, such a reduction in force may help to extend actuator longevity. Such a reduction may also be complemented by a reduction in energy consumed to maintain a wastegate in a closed position.

Figure 7:
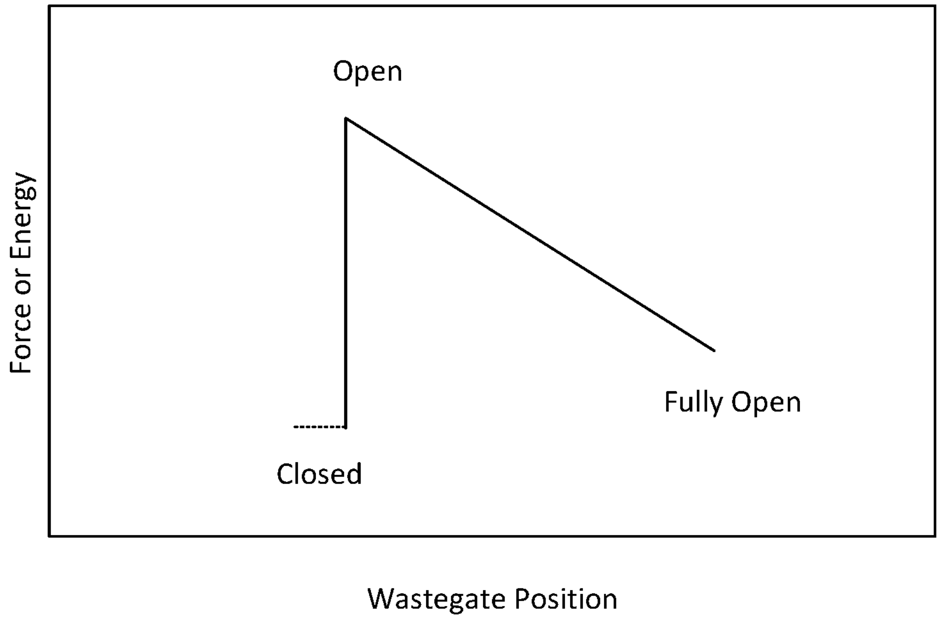
FIG. 7 shows an example of a plot of force or energy versus wastegate position.

FIG. 7 shows an example plot of force or energy versus wastegate position where, for example, the lowest force or energy for an actuator may be for maintaining the wastegate in a closed position, which may be assisted by a spring assembly (e.g., to help reduce risk of exhaust leakage). As shown, force or energy can be the greatest upon transitioning the wastegate from the closed position to a first or initial open position. Thereafter, force or energy can diminish as a spatial relationship between portion of a spring and a portion of a spring guide changes.

As an example, a plot of force or energy versus wastegate position may indicate a value of zero or approximately zero for the closed position (see, e.g., dotted line), for example, for a scenario with a pressure below a threshold in exhaust (e.g., consider a threshold based on a pressure differential, dP), which may be a scenario that is a most common normal steady-state driving condition scenario for an example design. As to the tail portion in the plot (e.g., at or near the closed position), it may be removed as force may be required for movement away from the closed position. As an example, control force may be used to counteract a pressure force (e.g., a dP force, etc.) in excess of a spring or guide force to help hold a wastegate in a closed position under certain operational conditions.

Figure 8:
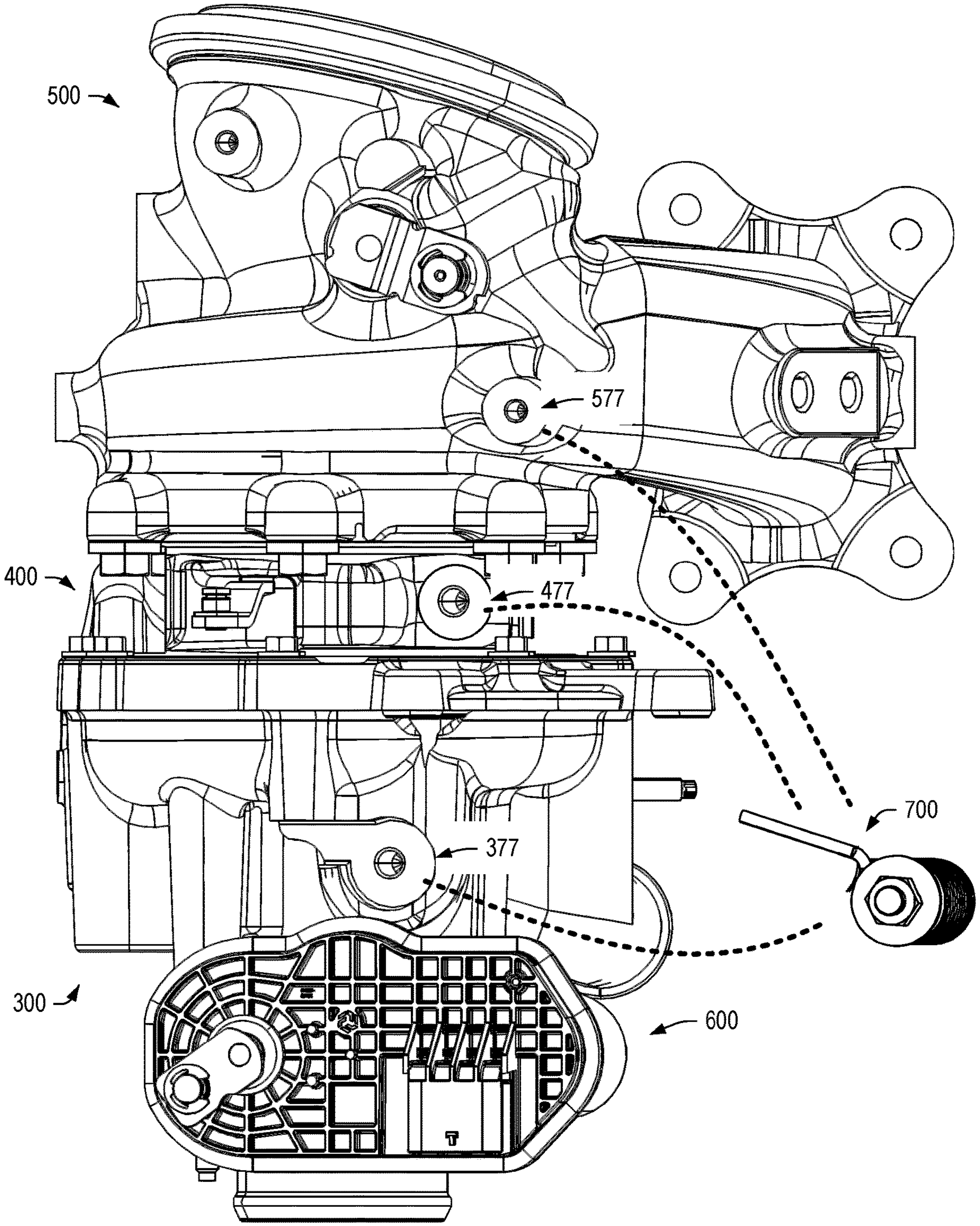
FIG. 8 shows a side view of an example of an assembly.

FIG. 8 shows an example of the assembly 200 where one or more features may be utilized for mounting of one or more spring assemblies. For example, consider a mount 377 on the compressor assembly 300, a mount 477 on the center housing assembly 400 and/or a mount 577 on the turbine assembly 500. For convenience, an instance of the spring assembly 700 is shown in FIG. 8, where one or more of instances of a spring assembly, whether the spring assembly 700 and/or another spring assembly, may be utilized. While various examples can include a spring assembly that engages a spring guide on an outer facing surface of a linkage assembly, a spring assembly may engage a spring guide on an inner facing surface of a linkage assembly. For example, consider the spring guide 840 as being positioned on the linkage 810 between the linkage and one or more of the housing assemblies 300, 400 and 500. As to a position that is on an outer facing surface, it may be exposed to slightly lower temperatures, which may have an impact on longevity of a spring assembly.

Figure 9:
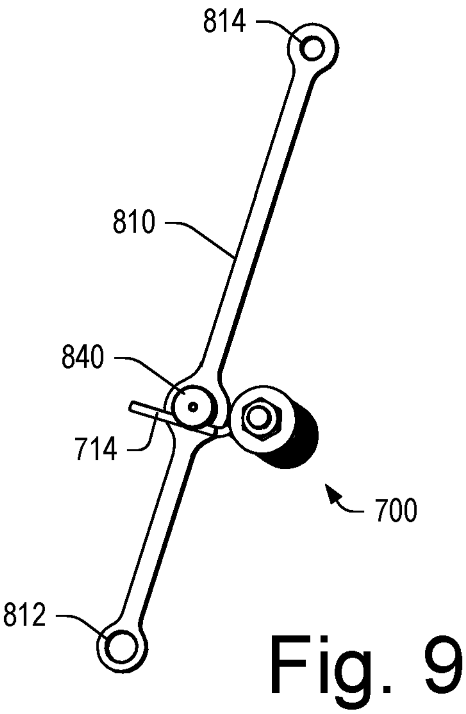
FIG. 9 shows a perspective view of an example of a linkage, a spring guide and a spring assembly.

FIG. 9 shows an example of the linkage 810 as including the spring guide 840 where the spring assembly 700 is positioned with the extension 714 on an opposite side for use with a PTC configuration rather than a PTO configuration. In a PTC configuration, the extension 714 can apply force to the linkage 810 in a pushing direction of the linkage 810 to help maintain a wastegate in a closed position.

Figure 10:
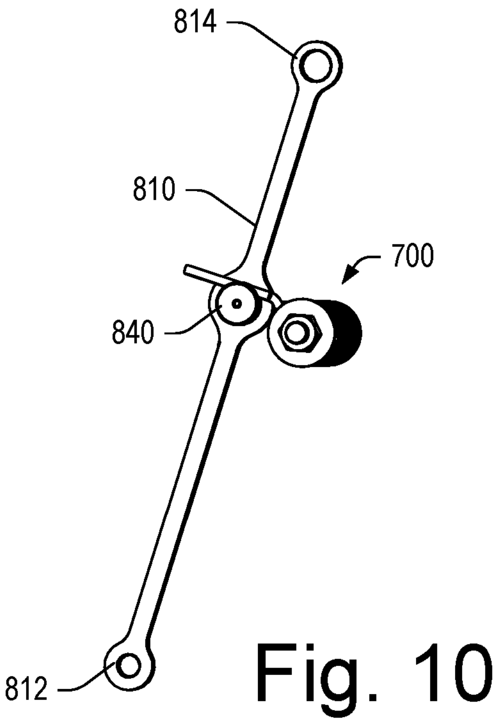
FIG. 10 shows a perspective view of an example of a linkage, a spring guide and a spring assembly.

FIG. 10 shows an example of the linkage 810 where the spring guide 840 is positioned closer to the wastegate coupling 814 than the control coupling 812. For example, consider the spring guide 840 as being positioned to correspond to a position of the spring assembly 700, which, as mentioned, may be mounted at one or more locations.

Figure 11:
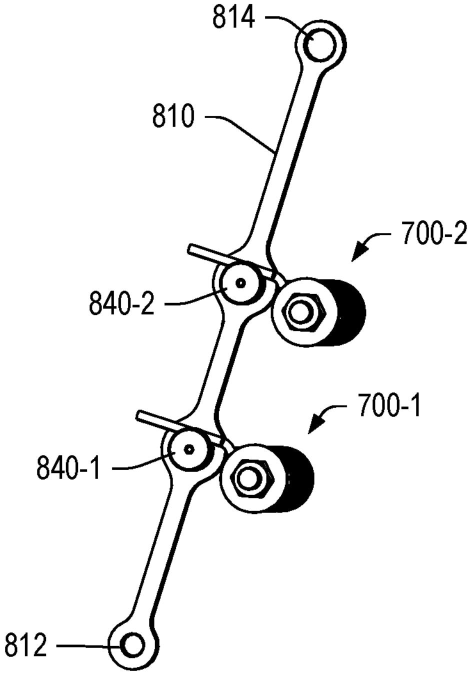
FIG. 11 shows a perspective view of an example of a linkage, one or more spring guides and one or more spring assemblies.

FIG. 11 shows an example of the linkage 810 as including more than one spring guide 840-1 and 840-2. In such an example, an assembly may include one or more spring assemblies 710-1 and 710-2, which may be the same or may differ from one another. As an example, a multiple spring approach may provide for redundancy and/or for use of springs with lesser force where total force is achieved by a sum of forces. As an example, through use of multiple springs with multiple spring guides, an assembly may have a tailored force profile with respect to position of a linkage. For example, consider one spring and spring guide pair as being tailored to increase force for further opening of a wastegate, which may, for example, provide for an open limit of a wastegate. In such an example, such a pair may alone, or in combination with another pair, result in a force that exceeds a rated force of an actuator such that the actuator cannot push a linkage further to cause further opening of a wastegate.

Figure 12:
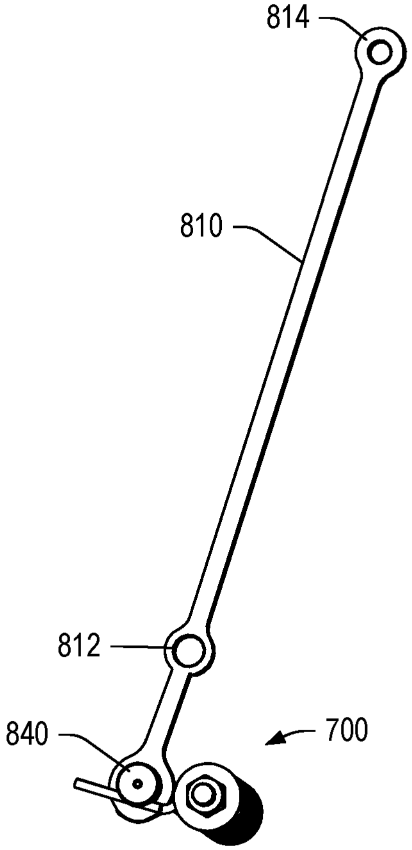
FIG. 12 shows a perspective view of an example of a linkage, a spring guide and a spring assembly.

FIG. 12 shows an example of the linkage 810 as including a spring guide 840 as being not between the control coupling 812 and the wastegate coupling 814; noting that the spring guide 840 may be beyond a control coupling or beyond a wastegate coupling. In such an example, the spring guide 840 may be positioned for being accommodated in an engine compartment, with respect to operational temperatures, with respect to access for inspection and/or servicing, etc. As an example, one or more features of the examples FIG. 9, FIG. 10, FIG. 11, FIG. 12 and/or one or more other examples may be utilized alone and/or in combination with one or more of the one or more features and/or one or more other features. As an example, the linkage 810 can include ends where, for example, a feature may be at an end or features at ends or, for example, one or more features may be disposed between opposing ends of a linkage.

FIG. 13A and FIG. 13B and FIG. 14A and FIG. 14B show examples of the spring guides 840 where the shape thereof may be tailored to achieve a desired force profile (see, e.g., the plot of FIG. 7). For example, the spring guide 840 may be rotatable or fixed and may have a guide surface that is shaped as a portion of a circle, a portion of an ellipse and/or of more or more other shapes. As an example, a spring guide may be shaped akin to a cam to thereby control evolution of force applied by a spring of a spring assembly.

Figure 13A:
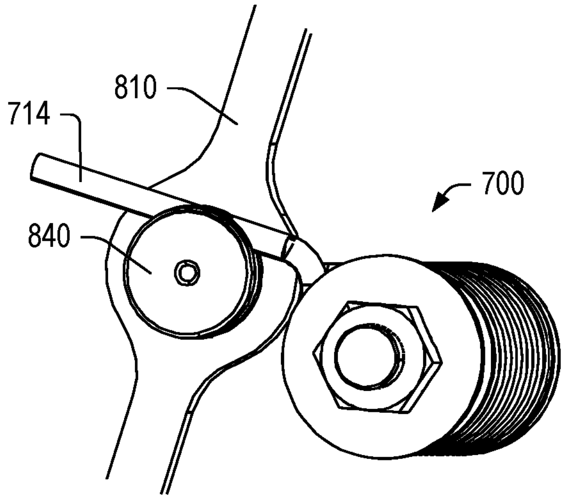
FIG. 13A and FIG. 13B show perspective views of an example of a linkage, a spring guide and a spring assembly in two positions.
Figure 13B:
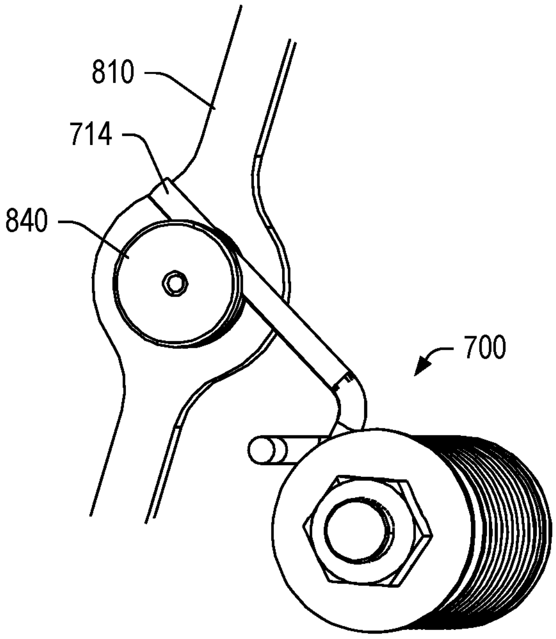

In the example of FIG. 13A and FIG. 13B, the spring guide 840 and/or the linkage 810 can include a bearing or a bushing and a shaft that may rotate via the bearing or the bushing. In such an approach, friction between the extension 714 and the spring guide 840 may have less interference with control; whereas, if the spring guide 840 is not rotatable (e.g., fixed), then some amount of friction may exist, which, depending on materials utilized, may result in some amount of wear over time (e.g., due to cycling between closed and open wastegate positions).

Figure 14A:
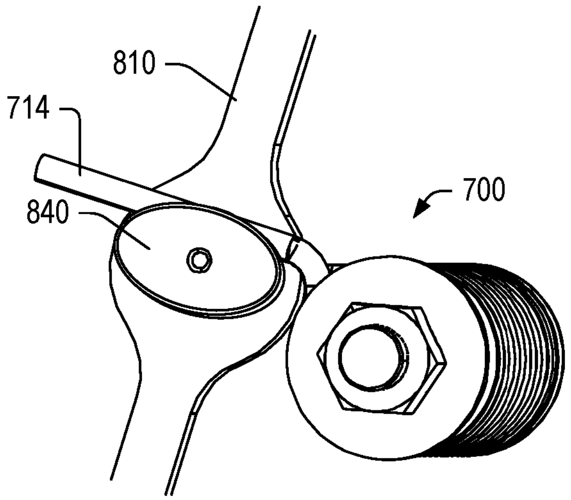
FIG. 14A and FIG. 14B show perspective views of an example of a linkage, a spring guide and a spring assembly in two positions.
Figure 14B:
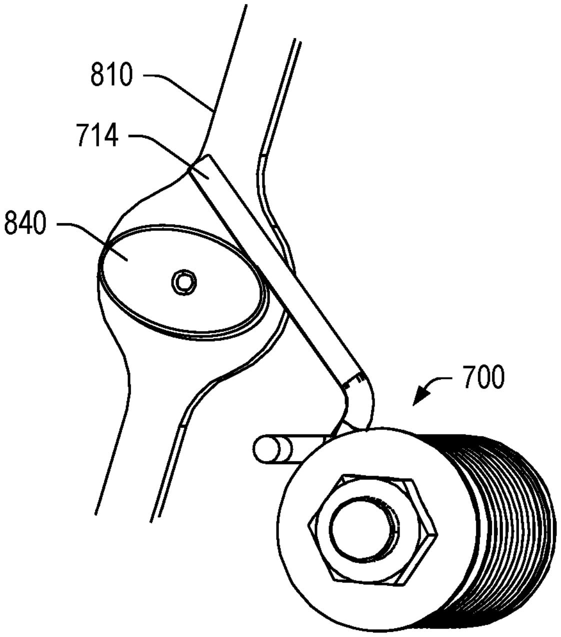

In the example of FIG. 14A and FIG. 14B, the spring guide 840 may have a shape that is not fully symmetric such that it may be fixed to achieve a desired force profile with respect to its shape as the shape can determine position of the extension 714 of the spring assembly 700. As shown in FIG. 14B, use of an elliptical shape of the spring guide 840 may result in more deflection of the extension 714 of the spring 710 when compared to use of a circular shape of the spring guide 840 where, for example, the minor axis of the elliptical shape is approximately equal to the radius of the circular shape.

Figure 15:
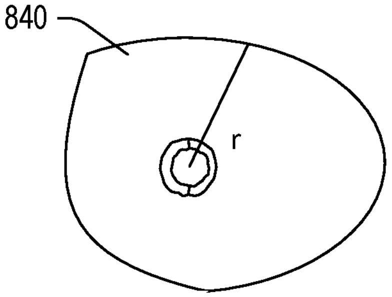
FIG. 15 shows a diagram of an example of a spring guide.
Figure 16:
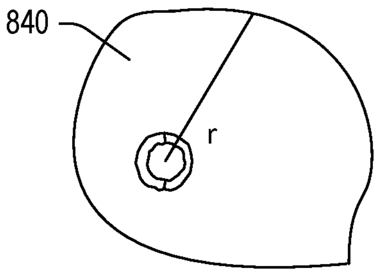
FIG. 16 shows a diagram of an example of a spring guide.

FIG. 15 and FIG. 16 shows some examples of shapes of spring guides 840 that may be utilized where, for example, a shape may be defined using coordinate system such as, for example, a cylindrical coordinate system where a perimeter of a shape may be defined by an r-coordinate measured from an axis (e.g., with respect to azimuthal angle).

Figure 17:
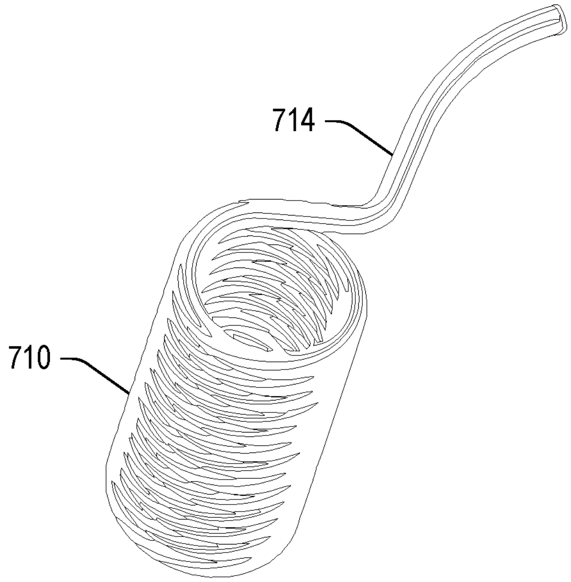
FIG. 17 shows a perspective view of an example of a spring.
Figure 18:
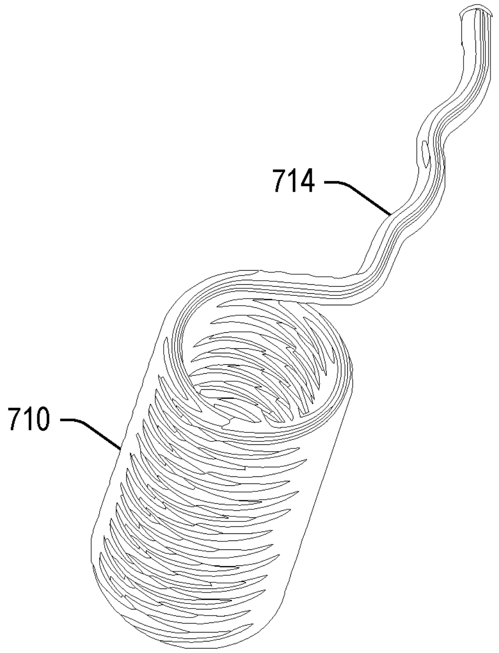
FIG. 18 shows a perspective view of an example of a spring.

FIG. 17 and FIG. 18 show some examples of shapes of extensions 714 of springs 710. As an example, a force profile (see, e.g., FIG. 7) may be tailored via one or more of a shape of a spring guide and a shape of a spring (e.g., a spring extension). As explained, a force profile may depend on an angle such as, for example, the angle $\phi$; noting that one or more features may be utilized for purposes of friction between a surface of a spring guide and a surface of a portion of a spring (e.g., a spring extension) to tailor a force profile.

As an example, a spring may be a torsion spring. As an example, consider a CS wire torsion spring with an approximately 25 Nmm/deg spring constant, a preload angle (e.g., closed position) of approximately 106.5 deg and a loaded angle (e.g., open position) of approximately 135.0 deg. In such an example, $F_c$ may be approximately 94.0 N and $L_c$ approximately 38.3 mm, with a torque of approximately 2663 Nmm; whereas, $F_o$ may be approximately 83.3 N and $L_o$ approximately 40.5 mm, with a torque of approximately 3375 Nmm. In such an example, the force along the x-axis of a linkage may be approximately 72.6 N; noting that a normal component of the applied force to a spring guide by a spring extension may be approximately 40.9 N (e.g., in the open position). As such, a reduction in force of over 20 N is achieved through an evolving relationship between a spring and a spring guide when an actuator moves a linkage to open a wastegate in a PTO configuration. As to a PTC configuration, it may also be referred to as a pull-to-open configuration. For example, consider FIG. 9 where pulling force required to pull-to-open a wastegate can diminish as the wastegate becomes more open (e.g., or otherwise according to how force is tailored, etc.).

As an example, the angle $\phi$ may be defined accordingly. For example, as shown in FIG. 6, the angle $\phi$ may be defined as 90 degrees in the closed position; noting that it may alternatively be defined as 0 degrees, which, when defined as 0 degrees, the open angle may be approximately 30 degrees (e.g., rather than 60 degrees). As explained, a force diagram may be utilized to determine effective force applied to a linkage. In various examples, in a closed position, a force diagram may demonstrate that force is applied predominantly along an axis of a linkage (see, e.g., the x-axis of the extension 714). For example, in a direction normal to that axis, force may be minimal (e.g., less than 10 percent of total force); whereas, in an open position, the force in a direction normal to that axis may be substantial.

As an example, when a wastegate is in an open position, there may be some additional possibility of rattling of one or more components as the wastegate is not held against a wastegate seat about a wastegate opening. In such an example, a component of force applied by a spring to a linkage assembly may act to cause forcible contact between various components, which may, in turn, act to reduce rattling (e.g., wear and/or noise). As explained, at an open position, a spring assembly may apply a substantial force that is normal to a longitudinal axis (e.g., x-axis) of a linkage such that components (e.g., coupling components, wastegate shaft, wastegate bore, wastegate bushing, etc.) may forcibly contact in a manner that is less impacted by vibrational force (e.g., exhaust pulsations, road surface variations, engine vibrations, etc.).

As explained, an assembly may include features for increasing the ability of a kinematic system to hold position(s) with passive spring force. Such an approach may help to reducing or eliminate force required from active control components under target operating conditions. As explained, a spring may be applied to a kinematic system to impart load to the kinematic system sufficient to hold a position(s), or reduce the effort of one or more other active inputs required to hold a position(s) (e.g., electromotive, pressure, etc.). In various examples, as a kinematic system moves away from a target position(s), resulting input force coming from a spring may act to reduce demand for force along a primary vector direction (e.g., a longitudinal axis of a linkage, etc.).

For the example of a Rotary Electric Actuator (REA) driven wastegate kinematic system, a spring guide can be utilized to provide for contact to a portion of a spring or spring assembly. For example, a spring guide can be added to a wastegate linkage (e.g., a control rod) to accept an extension arm of a torsion spring. In such an example, the torsion spring can be preloaded and impart force to a kinematic contact region. For example, consider an approach that involves targeting to increase a baseline force holding a wastegate in a closed position. In such an example, force may be applied to favor a full open position, or target an arbitrary open position within a kinematic range. In such an example, as a linkage travels through a range of motion from closed to open, the contact region (e.g., which may be approximated as a contact point) translates such that the torque advantage of the spring reduces, and the force vector also moves out of the primary direction. As explained, the force vector may have a component that is normal that may increase, which, in various instances may help to reduce noise (e.g., rattling) and/or wear when a wastegate is in an open position (e.g., wastegate rattling, linkage assembly rattling, actuator rattling, etc.). As explained, spring force can be adjusted and/or tailored via one or more approaches, which may include, for example, one or more of shape, coil dimensions, material, wire diameter, spring arm radial contact position (e.g., torque arm), spring arm shape (e.g., line, arc, complex, etc.), spring guide shape, spring guide size, etc., for a spring guide or spring guides and/or a spring or springs.

As an example, a spring assembly may include a post that may include threads that can be threaded into a bore in the compressor housing that includes matching threads. As an example, a spring assembly may be disposed in a spring assembly housing with an extension exposed (e.g., an exposed torque arm).

As explained, a spring assembly may be mounted to one or more features of an assembly where, for example, space may be available that allows for a suitable kinematic relationship between the spring assembly and a linkage assembly.

As explained, a spring guide and/or an extension of a spring may be shaped and/or sized to tailor force. For example, varying a radius may directly change a contact angle of a given linkage movement, which, in turn, may change the resultant component force in the direction of the linkage. As an example, a spring guide may be configured as a roller or it may be fixed. As explained, to shape the evolution of the force, one or more shapes may be utilized. As an example, a spring guide may be fixed (e.g., pinned, etc.) and may include a cam contour for sliding contact with an extension (e.g., a torque arm) of a spring.

As an example, a spring guide may be positioned in a suitable location and/or side of a linkage assembly. As explained, a configuration may be for a closed position of a pull-to-close (e.g., push-to-open or PTO) wastegate; whereas, for a push-to-close (PTC) wastegate, a different configuration may be utilized. As an example, a configuration may favor an open position of a pull-to-close wastegate where, for example, a winding direction of a torsion spring would be reversed, and the opposite side of a spring guide (e.g., roller, pin, cam, etc.) provides a contact region.

As an example, various components may have one or more standard machining surface finishes, which may or may not include a particular material coating to reduce spring material and/or component wear. As an example, a spring guide and a spring may provide for sliding contact and/or rolling contact. As an example, a spring guide may be integrally formed on a linkage. For example, consider a pin or a raised surface of the linkage itself (e.g., machined, stamped, etc.).

As an example, a spring assembly may forcibly bias a linkage assembly to reduce vibration and/or rattle (e.g., noise, vibration and harshness (NVH) reduction). As explained, in wastegate open positions, a linkage may be preloaded by a spring assembly. As an example, in a fully closed position, a spring assembly can provide an extension that acts as a torque arm with a predominant force component that is normal to a linkage longitudinal axis, which may help to maximize closing force applied by the spring assembly. However, if the nominal angle of the closed position was changed, it would result in preloading both pins in the closed position. The preload force would be a direct result of the contact angle, and would be a trade-off with ultimate closing force.

As an example, an assembly can include a turbine assembly that includes a wastegate; an actuator assembly that responds to a control signal to transition the wastegate from a closed position to an open position; a linkage assembly that includes a control coupling, a wastegate coupling, and a spring guide, where the wastegate coupling is operatively coupled to the wastegate and the control coupling is operatively coupled to the actuator assembly; and a spring assembly that includes a spring that includes an extension, where the extension forcibly contacts the spring guide at a closed angle of contact for the closed position of the wastegate and at an open angle of contact for the open position of the wastegate, where the open angle of contact is less than the closed angle of contact.

As an example, a spring guide may be fixed. As an example, a spring guide may be rotatable.

As an example, a spring guide may include a circular shaped contact surface. As an example, a spring guide may include an elliptical shaped contact surface.

As an example, a spring assembly may include a compressor housing mount. As an example, a spring assembly may include a turbine housing mount. As an example, a spring assembly may include a center housing mount.

As an example, a spring may be or may include a torsion spring.

As an example, a control coupling may be at a first end of a linkage assembly, a wastegate coupling may be at a second, opposing end of the linkage assembly, and a spring guide may be disposed between the first end and the second, opposing end. As an example, a spring guide may be disposed beyond a control coupling or beyond a wastegate coupling (see, e.g., the example of FIG. 12).

As an example, at an open angle of contact for an open position of a wastegate, a spring may apply force that reduces rattling where, for example, the force that reduces rattling is applied to a spring guide at a non-normal angle to a longitudinal axis of a linkage of a linkage assembly.

As an example, an actuator may be or may include a rotary actuator (e.g., consider an electric motor with a rotatable shaft, etc.). As an example, an actuator may be or may include a linear actuator, which may be electric, pneumatic, hydraulic, mechanical, etc.

As an example, a method may include, for an assembly that includes: a turbine assembly that includes a wastegate; an actuator assembly that responds to a control signal to transition the wastegate from a closed position to an open position; a linkage assembly that includes a control coupling, a wastegate coupling, and a spring guide, where the wastegate coupling is operatively coupled to the wastegate and the control coupling is operatively coupled to the actuator assembly; and a spring assembly that includes a spring that includes an extension, where the extension forcibly contacts the spring guide at a closed angle of contact for the closed position of the wastegate and at an open angle of contact for the open position of the wastegate, where the open angle of contact is less than the closed angle of contact, instructing the actuator assembly via the control signal to transition the wastegate from the closed position to the open position; and, during transitioning of the wastegate, automatically reducing force applied by the extension to the spring guide. For example, FIG. 6 shows an arrangement of components where various angles are indicated that may be associated with position of a spring guide as part of a linkage assembly. In such an example, various forces may be tailored (e.g., via shape, size, position, etc., of one or more components) to provide for desirable control of a wastegate (e.g., opening, closing, etc.).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger assembly comprising:

a turbocharger housing;

a turbine assembly that comprises a wastegate;

an actuator assembly that responds to a control signal to transition the wastegate from a closed position to an open position;

a linkage assembly that comprises a control coupling, a wastegate coupling, and a spring guide, wherein the wastegate coupling is operatively coupled to the wastegate and the control coupling is operatively coupled to the actuator assembly; and a spring assembly that comprises a spring that comprises an extension, wherein the extension forcibly contacts the spring guide at a closed angle of contact for the closed position of the wastegate and at an open angle of contact for the open position of the wastegate, wherein the open angle of contact is less than the closed angle of contact;

wherein the spring assembly is mounted on the turbocharger housing;

wherein the spring comprises a torsion spring.

2. The assembly of claim 1, wherein the spring guide is fixed.

3. The assembly of claim 1, wherein the spring guide is rotatable.

4. The assembly of claim 1, wherein the spring guide comprises a circular shaped contact surface.

5. The assembly of claim 1, wherein the spring guide comprises an elliptical shaped contact surface.

6. The assembly of claim 1, wherein the spring assembly comprises a compressor housing mount.

7. The assembly of claim 1, wherein the spring assembly comprises a turbine housing mount.

8. The assembly of claim 1, wherein the spring assembly comprises a center housing mount.

9. The assembly of claim 1, wherein the control coupling is at a first end of the linkage assembly, wherein the wastegate coupling is at a second, opposing end of the linkage assembly, and wherein the spring guide is disposed between the first end and the second, opposing end.

10. The assembly of claim 1, wherein, at the open angle of contact for the open position of the wastegate, the spring applies force that reduces rattling.

11. The assembly of claim 10, wherein the force that reduces rattling is applied to the spring guide at a non-normal angle to a longitudinal axis of a linkage of the linkage assembly.

12. The assembly of claim 1, wherein the actuator comprises a rotary actuator.

13. The assembly of claim 1, wherein the actuator comprises a linear actuator.

14. A method comprising:

for a turbocharger assembly that comprises:

a turbocharger housing;

a turbine assembly that comprises a wastegate;

an actuator assembly that responds to a control signal to transition the wastegate from a closed position to an open position;

a linkage assembly that comprises a control coupling, a wastegate coupling, and a spring guide, wherein the wastegate coupling is operatively coupled to the wastegate and the control coupling is operatively coupled to the actuator assembly; and a spring assembly that comprises a spring that comprises an extension, wherein the extension forcibly contacts the spring guide at a closed angle of contact for the closed position of the wastegate and at an open angle of contact for the open position of the wastegate, wherein the open angle of contact is less than the closed angle of contact;

wherein the spring assembly is mounted on the turbocharger housing;

wherein the spring comprises a torsion spring;

instructing the actuator assembly via the control signal to transition the wastegate from the closed position to the open position; and during transitioning of the wastegate, automatically reducing force applied by the extension to the spring guide.

* * * * *